United States Patent [19]

Nevermann et al.

[11] 3,853,289
[45] Dec. 10, 1974

[54] TRAILING EDGE FLAP AND ACTUATING MECHANISM THEREFOR

[75] Inventors: Carroll H. Nevermann; Ellis J. Roscow, both of Seattle, Wash.

[73] Assignee: The Boeing Company, Seattle, Wash.

[22] Filed: Feb. 15, 1973

[21] Appl. No.: 332,555

[52] U.S. Cl. ............................... 244/42 DA
[51] Int. Cl. ................................ B64c 3/50
[58] Field of Search.. 244/42 R, 42 B, 42 C, 42 CB, 244/42 D, 42 DA, 42 DB, 42 DC; 74/89, 99 R, 99 A

[56] References Cited
UNITED STATES PATENTS

| | | | |
|---|---|---|---|
| 2,563,453 | 12/1951 | Briend | 244/42 DB |
| 2,583,405 | 1/1952 | Youngman | 244/42 DB |
| 2,700,516 | 1/1955 | Nazir | 244/42 R |
| 3,767,140 | 10/1973 | Johnson | 244/42 D |

FOREIGN PATENTS OR APPLICATIONS

| | | | |
|---|---|---|---|
| 726,977 | 10/1942 | Germany | 244/42 DB |

*Primary Examiner*—Trygve M. Blix
*Assistant Examiner*—Sherman D. Basinger
*Attorney, Agent, or Firm*—Christensen, O'Connor, Garrison & Havelka

[57] ABSTRACT

A trailing edge flap, including a main segment and an aft segment is mounted on linkage for movement from a retracted position nested in the rear portion of a wing to an extended position. First linkage connects the main segment to the wing to move it forwardly and rearwardly while second linkage, interconnected by a programming link with the first linkage, properly positions the main segment between and in the extended and retracted positions. At least the major portion of the main segment is positioned rearwardly of the linkage connection to the wing. The aft segment is mounted on a track on the main segment and is moved to extended and retracted positions through a third linkage interconnected with the second linkage.

7 Claims, 2 Drawing Figures

PATENTED DEC 10 1974
3,853,289
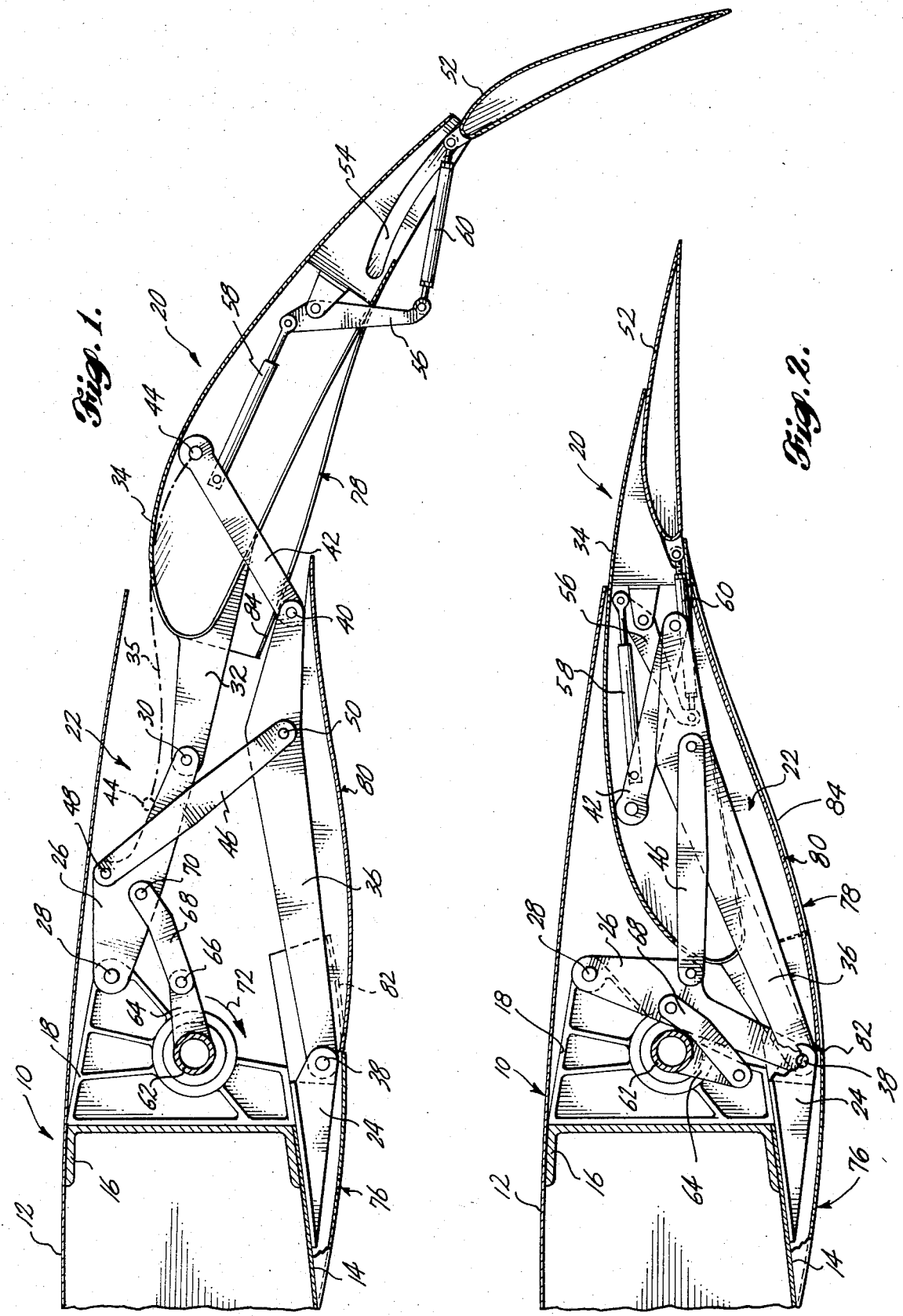

3,853,289

TRAILING EDGE FLAP AND ACTUATING MECHANISM THEREFOR

BACKGROUND OF INVENTION

The present invention relates to trailing edge flaps for an aircraft and more particularly to compact linkage mechanism connected to the wing without substantial structural reinforcement for moving the main segment of the trailing edge flaps between extended and retracted positions.

One means of providing a linkage to extend trailing edge flaps is by externally hinging the flaps below the wing to provide from single or multiple pivot points a large radius about which the flaps can move. However, for commercial applications where aerodynamic drag is desirably held to a minimum to increase fuel economy and range, an externally hinged flap mechanism is undesirable. Another actuating mechanism for operating trailing edge flaps has been suggested which incorporates a track and roller arrangement actuated by a jackscrew mechanism such as used on conventional commercial aircraft today.

objects of the present invention are to provide a linkage mechanism for a trailing edge flap system which employs a minimum number of pivoting linkages which can be actuated by a torque tube actuator; a trailing edge flap linkage system which will enable the flap segments to generate a large curvature in an extended position; a linkage system which is compact in the retracted position; a linkage which is connected to the wing structure very near the rearmost main spar in the wing, thus minimizing structural additions to the wing to accommodate the flap system; and a flap system wherein the major portion of the main segment of the flap system is positioned rearwardly of the pivotal connections of the linkage to fixed structure on the wing.

BRIEF DESCRIPTION OF THE DRAWINGS

A better understanding of the present invention can be acquired by reading the ensuing specification in conjunction with the accompanying drawings wherein:

FIG. 1 is a cross-sectional view in elevation showing the linkage and trailing edge flap mechanism of the present invention in an extended position; and FIG. 2 is a cross-sectional view in elevation showing the linkage and trailing edge flap mechanism of the present invention in a retracted position.

SUMMARY OF THE INVENTION

The present invention therefore provides apparatus for retracting and extending a main trailing edge flap segment to and from a nested position adjacent fixed structure on the rear of a wing. The apparatus includes a first linkage means, a second linkage means and a programming link means interconnecting the linkage means. The first linkage means is pivotally connected at one end to the fixed wing structure and is pivotally connected at its other end to the main flap segment to move the main segment forwardly and rearwardly. The second linkage means is pivotally connected at one end to the fixed structure on the wing and is pivotally connected at its other end to the main flap segment. The second linkage means is hinged at a position between its two ends. The programming link means pivotally interconnects the first linkage means and the second linkage means and cooperates with the second linkage means to orient the main flap segment at predetermined locations in a retracted position and in an extended position. The pivotal connections of the first and second linkage means to the fixed structure are located forwardly of the major portion of the main segment so that the flap system can be supported on or immediately rearwardly of the rear main spar of the wing. Another aspect of the invention is the provision of an aft flap segment having guide means thereon which translatably engage track means located on the main segment. A third linkage means interconnects the aft flap segment with the first or second linkage means to cause the aft segment to translate along the track means responsive to movement of the main segment between the extended and retracted positions.

DESCRIPTION OF PREFERRED EMBODIMENT

Referring now to FIG. 1, a wing section 10 is composed of an upper skin 12 and a lower skin 14. The skins 12 and 14 are sandwiched on each side of a spar 16. The wing spar 16 in the preferred embodiment is the rearmost spar in the wing section 10. A rib 18 is fastened to the rear face of the spar 16 and extends rearwardly therefrom. The trailing edge flaps, generally designated 20, are connected to the rib 18 through the linkage mechanism generally designated 22. The linkage mechanism 22 includes a set of positioning links 36 and 42 which are connected to a flange 24 fastened to the bottom portion of the wing segment 10 and secured to the spar 16 by conventional fastening means (not shown).

A main link 26 is pivotally connected by pin 28 to the rib 18 at one end and is pivotally connected by pin 30 to a forwardly extending flange 32. Flange 32 is connected to the forward portion of the main flap segment 34 of the trailing edge flaps 20. The set of flap positioning links 36 and 42 also interconnects the main segment 34 and the flange 24. The first positioning link 36 is pivotally connected by pin 38 to the flange 24 at one end and is pivotally connected by pin 40 to the second positioning link 42 at the other end. The second positioning link 42 is also pivotally connected by pin 44 to a rib on the main flap segment 34. A programming link 46 interconnects the main link 26 and the first positioning link 36. The programming link 46 is pivotally connected by pin 48 to the main link 26 and is pivotally connected at its other end by pin 50 to the main positioning link 36.

In the preferred embodiment illustrated, the trailing edge flaps 20 include both a main segment 34 and a trailing flap segment 52. The trailing flap segment 52 is movably connected to the main segment 34 through a track 54 into which mounting rollers connected to the trailing segment (the details of which are not shown) are slidably engaged. A bellcrank 56 is pivotally connected to the main segment 34. Two connecting links 58 and 60 interconnect the second positioning link 42 with the trailing segment 52. As the second positioning link 42 moves during retraction and extension, the trailing segment 52 is moved between retracted and extended positions.

The drive for the linkage 22 includes a torque tube 62 rotably mounted in rib 18. The torque tube is driven by a prime mover (not shown). An arm 64 extends radially from the torque tube 62 and is pivotally connected by pin 66 to link 68, which in turn is pivotally connected by pin 70 to the main link 26. As the torque tube 62 rotates the arm 64 in the direction of arrow 72, link 68 draws the main link 26 downwardly about the pivot pin 28. As this occurs, the trailing edge flaps 20 are retracted in a forward direction to the position shown in FIG. 2. The programming link 46 in coaction with the positioning links 36 and 42 positions the main flap segment 34 through the retraction path of pivot pin 44 indicated by dot-dash line 35 so that it first travels downwardly during retraction to miss the trailing edge of the upper skin 12 of the wing 10 and then in an upwardly direction to the retracted location of pivot pin 44, so that the flap system properly nests in the trailing portion of the wing to form the trailing edge section thereof.

As can be seen in both FIGS. 1 and 2, a fairing can be formed if desired over that portion of the linkage 22 which is exposed below the lower skin 14 of the main wing segment 10. A forward fairing section 76 is attached to the main wing segment 10 while a rear fairing section 78 is attached to the main flap segment 34. An intermediate fairing segment is attached to the link 36 and moves therewith. The intermediate section 80 mates with the contour of the forward fairing section 76 and the rearward fairing section 78 in a retracted position as shown in FIG. 2. As can be seen in FIG. 1, slots 82 and 84 are provided in the fairing segments 76 and 78, respectively, to accommodate the intermediate fairing segment 80 when the flaps are in a retracted position.

The present invention has been described in relation to a preferred embodiment. One of ordinary skill in the art, after reading the foregoing specification, will be able to effect various changes, substitutions of equivalents and other alterations to the preferred embodiment without departing from the original concept of the invention. It is therefore intended that the invention disclosed above be limited only by the definition of the appended claims.

What is claimed is:

1. An extending and retracting mechanism for a trailing edge flap system attached to a wing, said wing having a rear main spar and fixed structure affixed thereto, said flap system including at least a main flap segment having a rearward portion, the mechanism comprising:
   first link means pivotally connected at a first location thereon to said fixed structure adjacent the rear main spar of said wing and pivotally connected at a second location thereon to said main flap segment,
   second link means pivotally connected at a first location thereon to said fixed structure below said first link means adjacent the rear main spar of said wing, the major portion of said main flap segment being located rearwardly of the pivotal connections of said first and second link means to said fixed structure,
   third link means pivotally connected at a first location thereon to said main flap segment and pivotally connected at a second location thereon to a second location on said second link means, the pivotal connections of said first and third link means to said main flap segment being spaced from each other,
   programming link means pivotally connected at a first location thereon to a third location on said first link means and pivotally connected at a second location thereon to a third location on said second link means, said third location on said first link means being positioned between said first and second locations on said first link means, said third location on said second link means being positioned between said first and second locations on said second link means, said first, second and third link means and said programming link means being arranged so that the second location of said first link means prescribes a retraction path relative to said wing which includes a downwardly and forwardly curved portion preceding an upwardly and forwardly curved portion, said main flap segment being oriented downwardly and rearwardly relative to said wing in an extended position, the rearward portion of said main flap segment being rotated upwardly about said second location on said first link means as said second location on said first link means follows said retraction path, and
   power means for actuating said link means.

2. The mechanism of claim 1 wherein said power means comprises a torque rod mounted for rotation on said rear main spar of said wing, an arm connected to said rod and first connecting link means connecting said arm to one of said link means for imparting motion thereto as said rod rotates, said torque rod being located between the pivotal connections of said first and second link means to said fixed structure.

3. The mechanism of claim 2 wherein said first connecting link means is pivotally connected at a first location to said arm and pivotally connected at a third location between said first and second locations on said first link means.

4. The mechanism of claim 1 further comprising:
   an aft flap segment and means mounting said aft flap segment on said main flap segment for translation relative thereto, and
   second connecting link means pivotally connected at a first location thereon to said third link means and connected at a second location thereon to said aft flap segment, said second connecting link means for translating said aft flap segment means responsive to movement of said main segment.

5. The mechanism of claim 4 wherein said means mounting said aft flap segment comprises:
   track means mounted on said main segment, and
   guide means connected to said aft flap segment and engaging said track means for sliding movement therein, and wherein said second connecting link means comprises:
   a bell crank pivotally mounted on said main segment, a first connecting link pivotally connected at one end thereof to said third link means and pivotally connected at the other end thereof to one end of said bell crank means, and
   a second connecting link pivotally connected at one end thereof to said aft flap segment and pivotally connected at the other end thereof to the other end of said bell crank.

6. Apparatus for retracting and extending a main trailing edge flap segment to and from a nested position adjacent fixed structure on the rear of a wing comprising:
   first linkage means pivotally connected at one end to said fixed structure on said wing and pivotally connected at the other end to said main flap segment for moving said main flap segment forwardly and rearwardly, second linkage means pivotally connected at one end to said fixed structure on said wing at a location below and forwardly of the pivotal connection of said first linkage means to said fixed structure, and pivotally connected at the other end to said main flap segment, said second linkage means being hinged at a position between its two ends, the pivotal connections of said first and second linkage means to said main flap segment being spaced from each other, the pivotal connection of said first linkage means to fixed structure being above the pivotal connection of the second linkage means to fixed structure, programming link means pivotally connected to said first linkage means at a location between the ends of said first linkage means and pivotally connected to said second linkage means at a location between the ends of said second linkage means, said second linkage means and said programming link means cooperating to orient said main segment at predetermined locations in a retracted position and in an extended position, and means for actuating one of said linkage means.

7. The apparatus of claim 6 further comprising:

an aft flap segment having guide means thereon, said main segment having track means thereon with which said guide means translatably engages, and third linkage means pivotally connected to said aft flap segment and said second linkage means for causing said guide means to translate along said track means responsive to movement of said main segment.

* * * * *